US011679796B2

(12) United States Patent
Morrise

(10) Patent No.: US 11,679,796 B2
(45) Date of Patent: Jun. 20, 2023

(54) FOLDABLE BABY STROLLER

(71) Applicant: Jacob Morrise, Lehi, UT (US)

(72) Inventor: Jacob Morrise, Lehi, UT (US)

( * ) Notice: Subject to any disclaimer, the term of this patent is extended or adjusted under 35 U.S.C. 154(b) by 122 days.

(21) Appl. No.: 16/942,397

(22) Filed: Jul. 29, 2020

(65) Prior Publication Data

US 2023/0024504 A1 Jan. 26, 2023

Related U.S. Application Data

(60) Provisional application No. 62/964,303, filed on Jan. 22, 2020.

(51) Int. Cl.
*B62B 7/08* (2006.01)

(52) U.S. Cl.
CPC ............ *B62B 7/08* (2013.01); *B62B 2205/00* (2013.01)

(58) Field of Classification Search
CPC .. B62B 7/062; B62B 7/08; B62B 7/10; B62B 7/086
See application file for complete search history.

(56) References Cited

U.S. PATENT DOCUMENTS

| | | |
|---|---|---|
| 2,401,342 A | 6/1944 | Eckhardt |
| 2,871,921 A | 5/1956 | Fredric |
| 2,872,203 A | 2/1958 | Hedstrom |
| 3,796,439 A | 3/1974 | Perego |
| 3,989,295 A | 11/1976 | Sparkes |
| 4,216,974 A | 8/1980 | Kassai |
| 4,317,581 A | 3/1982 | Kassai |
| 4,428,598 A | 1/1984 | Kassai |
| 4,538,830 A | 9/1985 | Nakao |
| 4,828,278 A | 5/1989 | Shinroku |
| 5,669,623 A | 9/1997 | Onishi |
| 5,911,431 A | 6/1999 | Brown |
| 6,206,405 B1 | 3/2001 | Watkins |
| 6,220,621 B1 * | 4/2001 | Newton ................ B62B 5/0023 280/650 |
| 6,626,451 B1 | 9/2003 | Song |
| 6,814,368 B2 | 11/2004 | Cheng |

(Continued)

FOREIGN PATENT DOCUMENTS

| | | |
|---|---|---|
| CN | 201080198 Y | 8/2007 |
| CN | 106741099 | 6/2016 |

(Continued)

*Primary Examiner* — Jeffrey J Restifo
(74) *Attorney, Agent, or Firm* — Malcolm Pipes

(57) ABSTRACT

A foldable baby stroller that can comprise collapsible telescoping support shafts connected by a hinged handle. Pivot assemblies support the support shafts and two pairs of legs including at least one pair of rotating legs and one pair of fixed legs, each leg including an attached wheel. The pair of rotating legs when in a closed configuration fit below, adjacent, and parallel to the fixed pair of legs with the attached respective wheels of each pair arranged in tandem. A hinged support brace links the pair of pivot assemblies and locks in an extended configuration. Two seat supports attaching a seat to the stroller and fold upward 90° to facilitate configuring between the extended configuration and folded configuration by folding upward. The pivot assemblies facilitate folding the support shafts when in the retracted configuration, and the two pairs of legs when in the retracted configuration, together into the folded configuration.

20 Claims, 16 Drawing Sheets

(56) References Cited

U.S. PATENT DOCUMENTS

| | | | |
|---|---|---|---|
| 8,186,706 B2* | 5/2012 | Dotsey | B62B 7/10 |
| | | | 280/47.38 |
| 8,360,461 B2 | 1/2013 | Henry | |
| 8,366,139 B2 | 2/2013 | Kane | |
| 8,474,854 B2 | 7/2013 | Dean | |
| 8,590,919 B2 | 11/2013 | Yi | |
| 8,894,090 B1 | 11/2014 | Chen | |
| 8,979,114 B2 | 3/2015 | Cheng | |
| 9,174,661 B2 | 11/2015 | Li | |
| 9,421,991 B2* | 8/2016 | Driessen | B62B 7/06 |
| 9,764,754 B2 | 9/2017 | Zhang | |
| 9,834,243 B1* | 12/2017 | Zhang | B62B 7/086 |
| 9,969,417 B2* | 5/2018 | Ma | B62B 7/10 |
| 10,377,406 B2* | 8/2019 | Baek | B62B 7/105 |
| 10,618,542 B2* | 4/2020 | Cai | B62B 7/086 |
| 11,021,183 B2* | 6/2021 | Ma | B62B 7/086 |
| 2003/0052475 A1 | 3/2003 | Suga | |
| 2009/0184073 A1 | 7/2009 | Lu | |
| 2009/0278335 A1* | 11/2009 | Dotsey | B62B 7/10 |
| | | | 280/647 |
| 2011/0221169 A1* | 9/2011 | Karremans | B62B 7/064 |
| | | | 280/647 |
| 2015/0084313 A1* | 3/2015 | Tricault | B62B 7/004 |
| | | | 280/650 |
| 2015/0166088 A1* | 6/2015 | Khodor | B62B 5/026 |
| | | | 280/639 |
| 2017/0313338 A1* | 11/2017 | Ma | B62B 7/086 |
| 2022/0348248 A1* | 11/2022 | Ma | B62B 7/064 |
| 2023/0024504 A1* | 1/2023 | Morrise | B62B 7/08 |

FOREIGN PATENT DOCUMENTS

| | | |
|---|---|---|
| EP | 1900599 | 9/2006 |
| EP | 2308741 B1 | 7/2008 |

* cited by examiner

REPLACEMENT DRAWING

REPLACEMENT DRAWING

REPLACEMENT DRAWING

FOLDABLE BABY STROLLER

CROSS REFERENCE TO RELATED APPLICATIONS

This application claims priority from provisional patent application 62/964,303, filed on Jan. 22, 2020, which is incorporated by reference herein.

FIELD OF INVENTION

The present invention relates to the field of baby strollers, and, more particularly to a baby stroller that can be folded up into a very compact configuration.

BACKGROUND

Many parents and child care workers can have problems when it comes to transporting a baby stroller. Conventional baby strollers are bulky and very difficult to stow in many situations when necessary. For example, even a foldable baby stroller is virtually impossible to fold into a compact configuration for easy stowage when traveling by airliner or subway. Current trends find air travel particularly challenging as many travelers have switched from checked luggage to carry on luggage, making bin stowage a very daunting task. Strollers are also virtually impossible take on amusement park rides, stowing when going to an office appointment (doctor, dentist, etc), eating at a restaurant, going to a movie, traveling by Uber or Lyft, etc.

The disclosed invention is a foldable baby stroller that folds down into a compact configuration small enough to fit into a diaper bag, purse, or backpack, etc. It is designed to fold down to a very small size and be light in weight for easy portability. The current prototype folds down to 13.5" long by 5.5" wide by 3.5" tall. These dimensions can vary up or down depending on the final design.

Based on the foregoing, there is a need in the foldable baby stroller field of baby strollers to provide a very compact design that can be easily stowed without taking up much stowage space.

SUMMARY

In an embodiment, a foldable baby stroller that can comprise collapsible telescoping support shafts connected by a hinged handle. Pivot assemblies support the support shafts and two pairs of legs including at least one pair of rotating legs and one pair of fixed legs, each leg including an attached wheel. The pair of rotating legs when in a closed configuration fit below, adjacent, and parallel to the fixed pair of legs with the attached respective wheels of each pair arranged in tandem. A hinged support brace links the pair of pivot assemblies and locks in an extended configuration. Two seat supports attaching a seat to the stroller and fold upward 90° to facilitate configuring between the extended configuration and folded configuration by folding upward. The pivot assemblies facilitate folding the support shafts when in the retracted configuration, and the two pairs of legs when in the retracted configuration, together into the folded configuration.

In an embodiment, a foldable baby stroller comprises a pair of collapsible support shafts arranged in parallel and configurable between a telescoped and a retracted configuration, each with a distal end connected by a hinged handle extending between the pair, wherein the hinged handle includes a first locking latch and further folds together between a folded and an extended configuration. A pair of pivot assemblies, each supporting one of the collapsible support shafts attached to a proximal end and extending upward at an angle greater than 90° from horizontal and four legs, the support shafts locking in the telescoped configuration and unlocking to retract into the retracted configuration. The pair of pivot assemblies also comprises two pairs of legs including at least one pair of rotating legs and one pair of fixed legs, each leg including an attached wheel at a distal end of the leg. The pair of rotating legs that when in a closed configuration fit below, adjacent, and parallel to the fixed pair of legs with the attached respective wheels of each pair arranged in tandem, and that when in an open configuration are positioned at greater than or equal to 90° from and relative to the fixed pair of legs. At least one hinged support brace links the pair of pivot assemblies, and the support brace includes a second locking latch and further folds into the folded configuration and extends into the extended configuration. A pair of seat supports fold upward 90° and facilitates configuring between the extended configuration by extending downward 90° relative to the pair of collapsible support shafts and the folded configuration by folding upward to lay parallel to the pair of collapsible support shafts. The pivot assemblies facilitate folding the pair of support shafts when in the retracted configuration, and the two pairs of legs when in the retracted configuration, together into the folded configuration. When folded together into the folded configuration, each one of the pair of support shafts and each one of the two pair of legs comprises a pair of shaft and leg assemblies positioned adjacent to and parallel to each other, and further can comprise one of the pair of seat supports.

The pair of seat supports mount to the pair of support shafts using a second pivot assembly supporting rotating the pair of seat supports upward 90°, wherein the second pivot assembly attaches to the pair of support shafts above the pivot assembly.

A second lateral support connects the pair of seat supports together.

The pair of collapsible support shafts comprise concentric-sized sections designed to slide in and out of each other to telescope and retract and lock in the telescoped configuration.

The pair of collapsible support shafts comprise tubular sections designed to slide in and out of each other to telescope and retract and lock in the telescoped configuration.

The pair of collapsible support shafts telescope and retract by a folding mechanism, a scissor mechanism, or an external extension.

The baby stroller in the folded configuration has a maximum length of approximately 13.5".

The seat supports facilitate attaching a cloth seat to hold a baby.

In an embodiment, a method of constructing a reconfigurable baby stroller, comprising the steps of arranging a pair of collapsible support shafts in parallel and configurable between a telescoped and a retracted configuration, each with a distal end connected by a hinged handle extending between the pair of collapsible support shafts, wherein the hinged handle includes a first locking latch and further folds together between a folded and an extended configuration; providing a pair of pivot assemblies, each supporting one of the collapsible support shafts attached to a proximal end and extending upward at an angle greater than 90° from horizontal and four legs, the support shafts lock into the telescoped configuration and unlock to retract into the retracted configuration; attaching two pairs of legs to the pair of pivot assemblies, including at least one pair of rotating legs and one pair of fixed legs, each leg including an attached compact wheel at a distal end of the leg; positioning the pair of rotating legs so that when in a closed configuration fit below, adjacent, and parallel to the fixed pair of legs with the attached respective wheels of each pair arranged in tandem, and that when in an open configuration are positioned at greater than or equal to 90° from and relative to the fixed pair of legs; linking the pair of pivot assemblies with at least one hinged support brace, wherein the support brace includes a second locking latch and further folds into the folded configuration and extends into the extended configuration; providing a pair of seat supports that fold upward 90° and facilitates configuring between the extended configuration by extending downward 90° relative to the pair of collapsible support shafts, and the folded configuration by folding upward to lay parallel to the pair of collapsible support shafts; using the pivot assemblies to facilitate folding the pair of support shafts when in the retracted configuration, and the two pairs of legs when in the retracted configuration, together into the folded configuration; wherein when folded together into the folded configuration, each one of the pair of support shafts and each one of the two pair of legs comprises a pair of shaft and leg assemblies positioned adjacent to and parallel to each other, and further can comprise one of the pair of seat supports.

In an embodiment, a folding baby stroller having a very compact folded and an extended configuration comprises two parallel collapsible support shafts configurable between a telescoped and a retracted configuration, with distal ends connected by a hinged handle, wherein the hinged handle locks between the folded configuration and the extended configuration. Two pivot assemblies support the two collapsible support shafts attach to a proximal end of the support shafts extending upward at an angle greater than 90° from horizontal, with four legs attached, and the support shafts telescope and lock in the telescoped configuration and unlock to retract into the retracted configuration. Two pivot assemblies comprise four legs including at least one pair of rotating legs and one pair of fixed legs, each leg including an attached compact wheel at a distal end of the leg. The pair of rotating legs when in a closed configuration fit below, adjacent, and parallel to the fixed pair of legs with the attached respective compact wheels of each pair arranged in tandem, and that when in an open configuration are positioned at greater than or equal to 90° from and relative to the fixed pair of legs. At least one hinged support brace links the two pivot assemblies, wherein the support brace extends and locks in the extended configuration, and unlocks to fold into the folded configuration. A pair of seat supports that fold upward 90° and facilitates configuring between the extended configuration, by extending downward 90° relative to the pair of collapsible support shafts, and the folded configuration, by folding upward to lay parallel to the two of collapsible support shafts. The pivot assemblies facilitate folding the two support shafts when in the retracted configuration, and the two pairs of legs when in the retracted configuration, together into the folded configuration. When folded together into the folded configuration, each one of support shafts and each one of the two pair of legs comprises a pair of shaft and leg assemblies positioned adjacent to and parallel to each other, and further can comprise one of the pair of seat supports.

Advantages:
1. Ease of folding into a compact configuration for stowage.
2. Light weight.
3. Ability to stow in a purse, backpack, or diaper bag.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
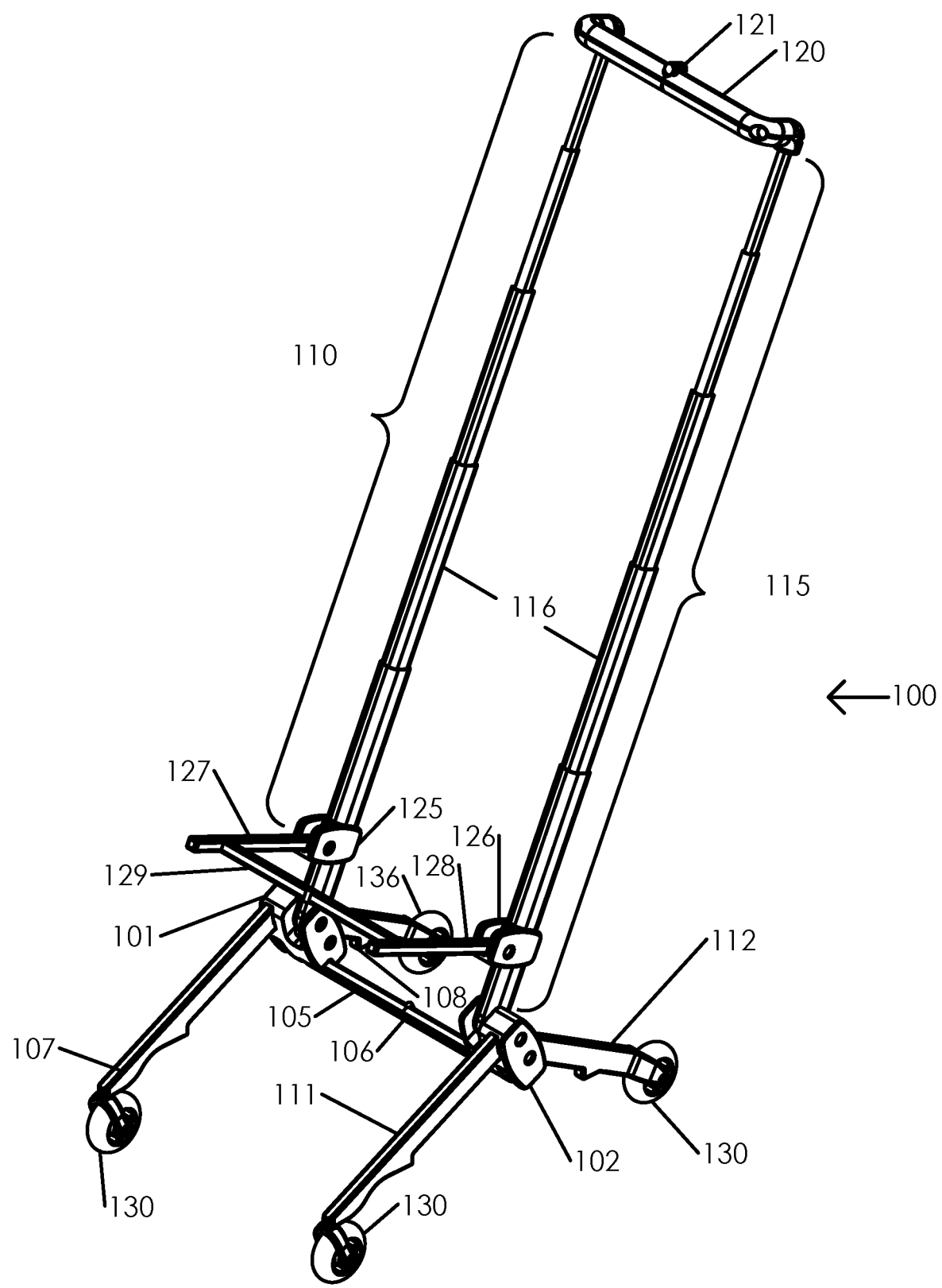
FIG. 1 is an exemplary ¾ front view of the foldable baby stroller, according to an embodiment of the present invention.

Preferred embodiments of the present invention and their advantages may be understood by referring to FIGS. 1-19, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

When used in relation to a measured dimension, the term "about," "approximate" or "approximately" refers generally to +/−1" to as much as +/−3" variation to the stated dimension. When used in relation to a rotation, the term "about," "approximate" or "approximately" refers generally to +/−10° to as much as +/−30° variation to the stated rotation.

Devices or system modules that are in at least general communication with each other need not be in continuous communication with each other, unless expressly specified otherwise. In addition, devices or system modules that are in at least general communication with each other may communicate directly or indirectly through one or more intermediaries.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

FIG. 1 shows an embodiment exemplary ¾ front view of a foldable baby stroller 100 according to a preferred embodiment. Foldable baby stroller 100 can be constructed from resilient plastic or other polymers, metal such as aluminum, composites, or carbon fiber. Two pivot assemblies, right pivot assembly 101 and left pivot assembly 102, can be connected together by a lower hinged lateral support brace 105, which can have a locking hinge 106 that allows folding. Right pivot assembly 101 can support attachment of right front leg 107, right rear folding leg 108, telescoping right support shaft 110 and telescoping left support shaft 115. The pivot assemblies 101 and 102 can allow the attached telescoping support shafts 110 and 115 to rotate between an open and a closed configuration. In an embodiment, the telescoping support shafts 110 and 115 can rotate approximately 120°, and further can include a locking and latching mechanism, such as a button release latch. The telescoping support shafts 110 and 115 can extend upward and recline about 150° from horizontal, but this can vary to as little as approximately 100° (i.e., 10° to 60° from vertical). The pivot assemblies 101 and 102 can also allow the attached folding legs 108 and 112 to rotate about 120° to 150°, and as much as 90° to 180°, between an open and closed configuration. In a preferred embodiment, the angle between the two pairs of legs can be approximately 120°.

The telescoping support shafts 110 and 115 can consist of a plurality of paired ribbed or grooved shaft cylinders 116 sized and fitted together so as to telescope inside each other and facilitate folding the foldable baby stroller 100. The ribs or grooves can prevent binding as the shaft cylinders 116 are moved in and out of each other, provide lateral stability, and increase stiffness to resist bending. Each successive pair of shaft cylinders 116 can be sized to fit snugly inside the next larger successive pair of shaft cylinders 116 but still slide in and out. The shaft cylinders 116 can also include a locking mechanism to lock the shaft cylinders 116 in an extended and/or retracted configuration. In alternative embodiments, shaft cylinders 116 can be rectangular-shaped in cross-section, and more generically can be referred to as shaft sections.

The upper end of the telescoping support shafts 110 and 115 can be attached to a hinged handle 120 that can be folded using locking hinge 121. The lower end of telescoping right support shaft 110 can include a right pivot bracket 125 mounting right seat support 127 using a pivot mechanism allowing right seat support 127 to rotate up approximately 90° to lay parallel to telescoping support shaft 110. The lower end of telescoping left support shaft 115 can include a left pivot bracket 126 mounting left seat support 128 using a pivot mechanism allowing left seat support 128 to rotate up approximately 90° to lay parallel to telescoping left support shaft 115. Seat supports 127 and 128 can be connected by a hinged lateral support brace 129. Alternatively, the pivot brackets 125 and 126 can be eliminated, and seat supports 127 and 128 can be mounted and integrated with a pivoting mechanism in pivot assemblies 101 and 102. Each of pivot mechanisms 101, 102, 125, and 126 can include various locking mechanisms to firmly lock the pivoting seat supports 127 and 128 or folding legs 108 and 112 in place. Folding legs 108 and 112 can rotate through about 120° to 150° from an open to a folded configuration. Wheels 130 can be attached to the ends of legs 107, 108, 111, and 112 opposite from pivot assemblies 101 and 102. Wheels 130 can be used similar to roller blades and foldable scooters, and are generally made out of hard plastic, but can be made of metal, rubber or another material. Wheels 130 can be 1"-6" in diameter and up to 3" thick to allow for a compact design. The wheels 130 can be classified as a compact wheel, and in a preferred embodiment are 2.5" in diameter by 1" thick. Wheels 130 can generally be made out of hard plastic, metal, rubber, acrylic, or another material. Further, the wheels 130 can swivel, which allows the stroller 100 to be more maneuverable.

Figure 2:
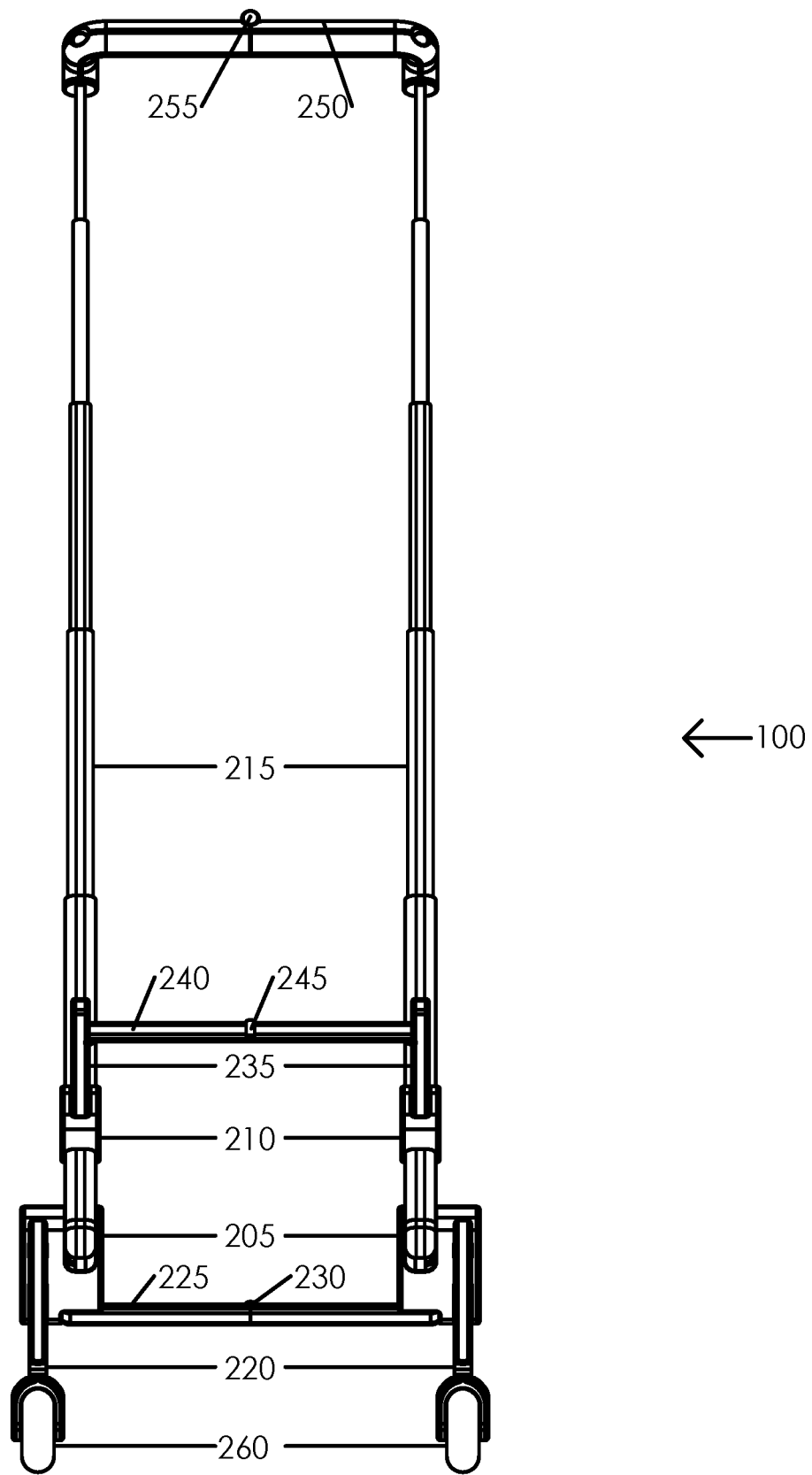
FIG. 2 is an exemplary front view of the foldable baby stroller, according to an embodiment of the present invention.

FIG. 2 depicts an exemplary front view of the foldable baby stroller 200 as shown in FIG. 1. As depicted, a pair of pivot assemblies 205 can support a pair of telescoping support shafts 215 and two pairs of legs 220 (four total). Approximately 3" to 6" above the pivot assemblies 205 a pair of pivot brackets 210 can be mounted on telescoping support shafts 215. The pivot brackets 210 can be mounted so as to adjust by sliding up and down on telescoping support shafts 215. The pivot brackets 210 can include seat supports 235 that can pivot upward within pivot brackets 210. The seat supports in turn can be connected by hinged lateral support brace 240, which can include locking hinge 245. The distal upper end of the telescoping shafts 215 can be capped by attached hinged handle 250, and locking hinge 255 can allow the hinged handle 250 to fold inward. Hinged lateral support brace 225 can connect pivot assemblies 205 together, and locking hinge 230 can allow the hinged lateral support brace 225 to fold inward. Finally, compact wheels 260 can be attached to legs 220.

Figure 3:
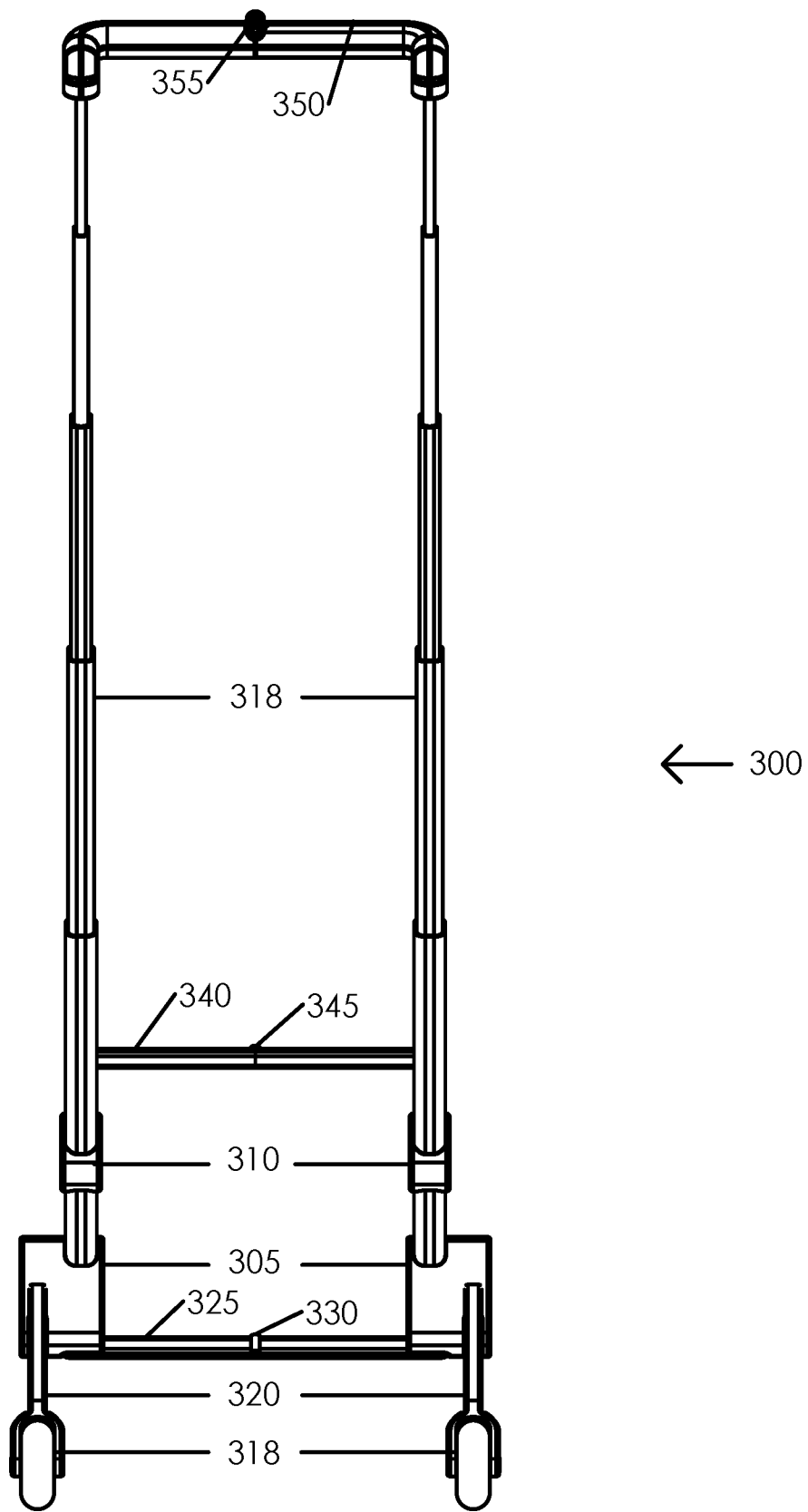
FIG. 3 is an exemplary rear view of the foldable baby stroller, according to an embodiment of the present invention.

FIG. 3 depicts an exemplary rear view of the foldable baby stroller 300 as shown in FIG. 1. As depicted, a pair of pivot assemblies 305 can support a pair of telescoping support shafts 315 and two pairs of legs 320 (four total). Approximately 3" to 6" above the pivot assemblies 305 a pair of pivot brackets 310 can be mounted on telescoping support shafts 315. The pivot brackets 310 can be mounted so as to adjust by sliding up and down on telescoping support shafts 315. The distal upper end of the telescoping shafts 315 can be capped by attached hinged handle 350, and locking hinge 355 can allow the hinged handle 350 to fold inward. Hinged lateral support brace 325 can connect pivot assemblies 305 together, and locking hinge 330 can allow the hinged lateral support brace 335 to fold inward. Finally, compact wheels 360 can be attached to legs 320.

Figure 4:
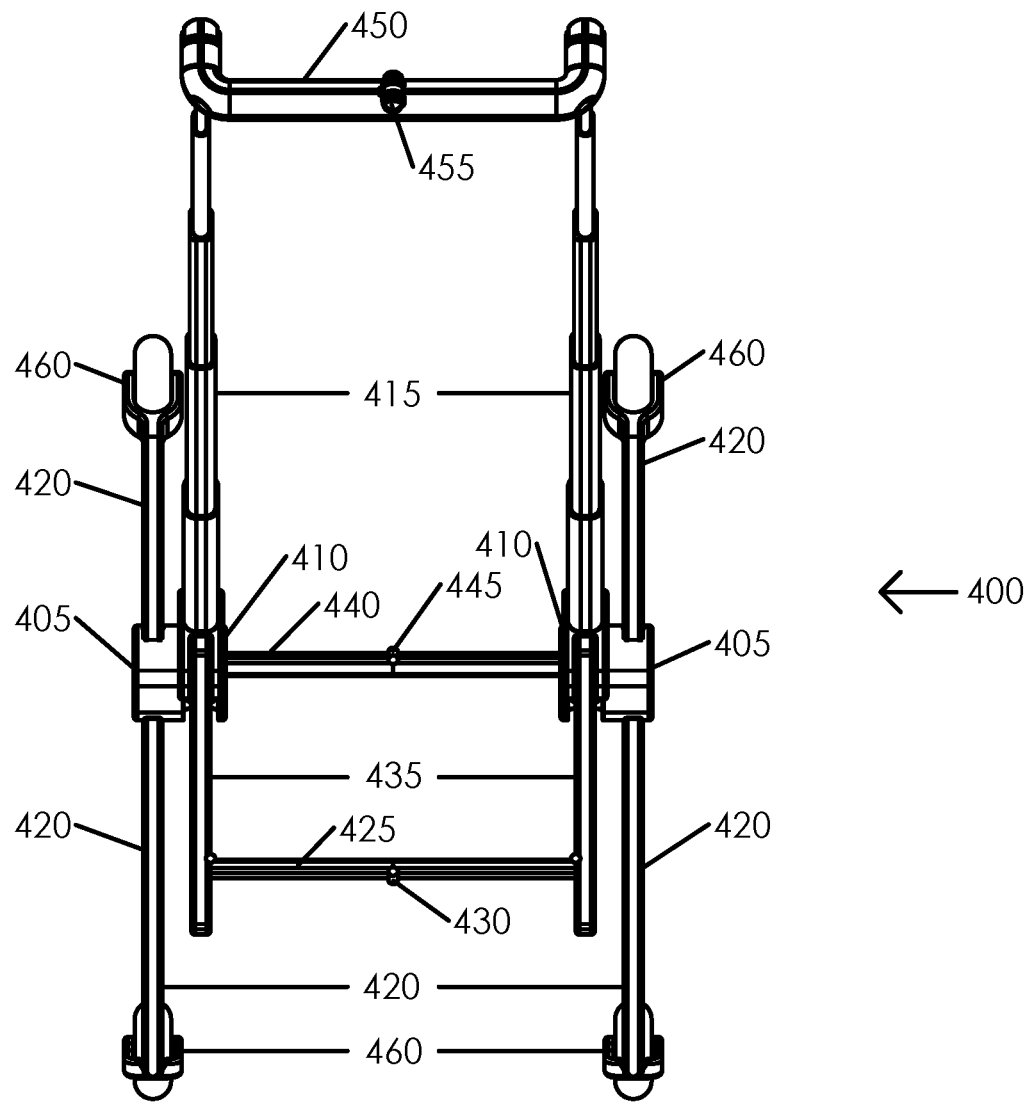
FIG. 4 is an exemplary centered top view of the foldable baby stroller, according to an embodiment of the present invention.

FIG. 4 depicts an exemplary centered top view of the foldable baby stroller 400 as shown in FIG. 1. As depicted, a pair of pivot assemblies 405 can support a pair of telescoping support shafts 415 and two pairs of legs 420 (four total). Approximately 3" to 6" above the pivot assemblies 405 a pair of pivot brackets 410 can be mounted on telescoping support shafts 415. The pivot brackets 410 can be mounted so as to adjust by sliding up and down on telescoping support shafts 415. The pivot brackets 410 can include seat supports 435 that can pivot upward within pivot brackets 410. The seat supports 435 in turn can be connected by hinged lateral support brace 440, which can include locking hinge 445. The distal upper end of the telescoping shafts 415 can be capped by attached hinged handle 450, and locking hinge 455 can allow the hinged handle 450 to fold inward. Hinged lateral support brace 425 can connect pivot assemblies 405 together, and locking hinge 430 can allow the hinged lateral support brace 425 to fold inward. Finally, compact wheels 460 can be attached to legs 420.

Figure 5:
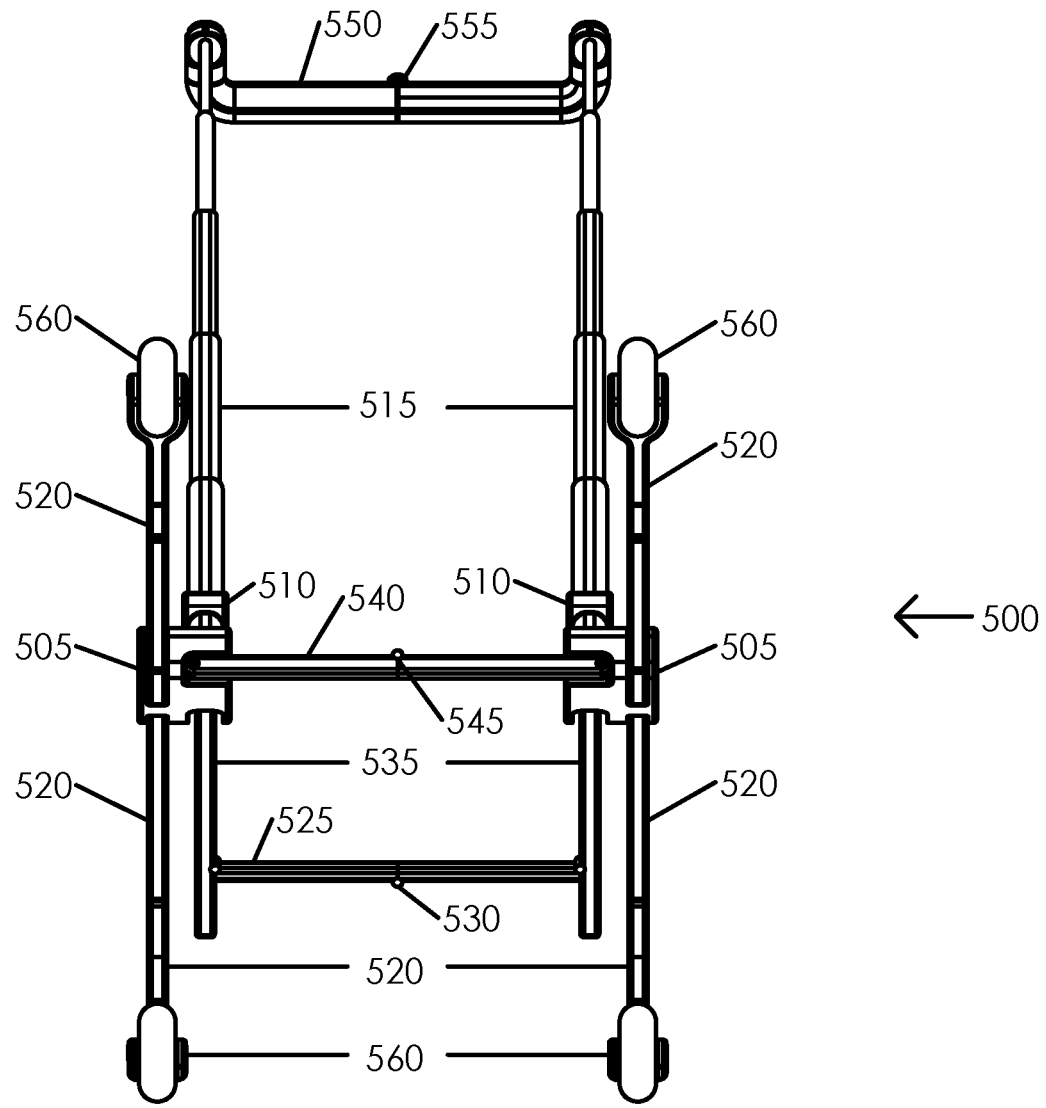
FIG. 5 is an exemplary centered bottom view of the foldable baby stroller, according to an embodiment of the present invention.

FIG. 5 depicts an exemplary centered bottom view of the foldable baby stroller 500. As depicted, a pair of pivot assemblies 505 can support a pair of telescoping support shafts 515 and two pairs of legs 520 (four total). Approximately 3" to 6" above the pivot assemblies 505 a pair of pivot brackets 510 can be mounted on telescoping support shafts 515. The pivot brackets 510 can be mounted so as to adjust by sliding up and down on telescoping support shafts 515. The pivot brackets 510 can include seat supports 535 that can pivot upward within pivot brackets 510. The seat supports 535 in turn can be connected by hinged lateral support brace 540, which can include locking hinge 545. The distal upper end of the telescoping shafts 515 can be capped by attached hinged handle 550, and locking hinge 555 can allow the hinged handle 550 to fold inward. Hinged lateral support brace 525 can connect pivot assemblies 505 together, and locking hinge 530 can allow the hinged lateral support brace 525 to fold inward. Finally, compact wheels 560 can be attached to legs 520.

Figure 6:
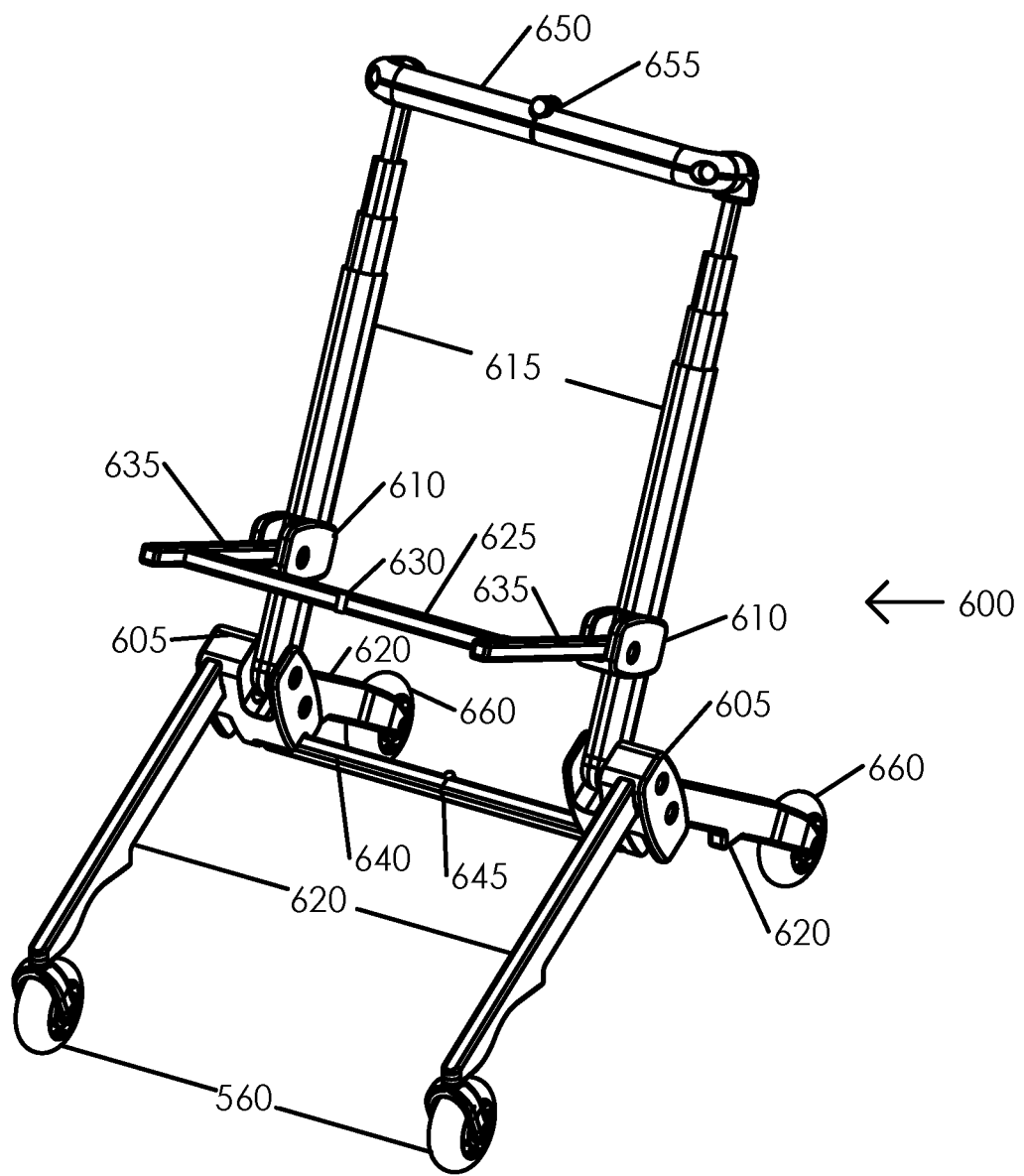
FIG. 6 is an exemplary ¾ front view of the foldable baby stroller with the telescoping support shafts partially retracted, according to an embodiment of the present invention.

FIG. 6 depicts an exemplary ¾ front view of the foldable baby stroller 600 with the telescoping support shafts 615 partially retracted. As depicted, a pair of pivot assemblies 605 can support a pair of telescoping support shafts 615 and two pairs of legs 620 (four total). The pair of telescoping support shafts 615 are partially retracted as shown by telescoping the telescoping support shafts 615 toward a retracted configuration. Approximately 3" to 6" above the pivot assemblies 605 a pair of pivot brackets 610 can be mounted on telescoping support shafts 615. The pivot brackets 610 can be mounted so as to adjust by sliding up and down on telescoping support shafts 615. The pivot brackets 610 can include seat supports 635 that can pivot upward within pivot brackets 610. The seat supports 635 in turn can be connected by hinged lateral support brace 640, which can include locking hinge 645. The distal upper end of the telescoping shafts 615 can be capped by attached hinged handle 650, and locking hinge 655 can allow the hinged handle 650 to fold inward. Hinged lateral support brace 625 can connect pivot assemblies 605 together, and locking hinge 630 can allow the hinged lateral support brace 625 to fold inward. Finally, compact wheels 660 can be attached to legs 620.

Figure 7:
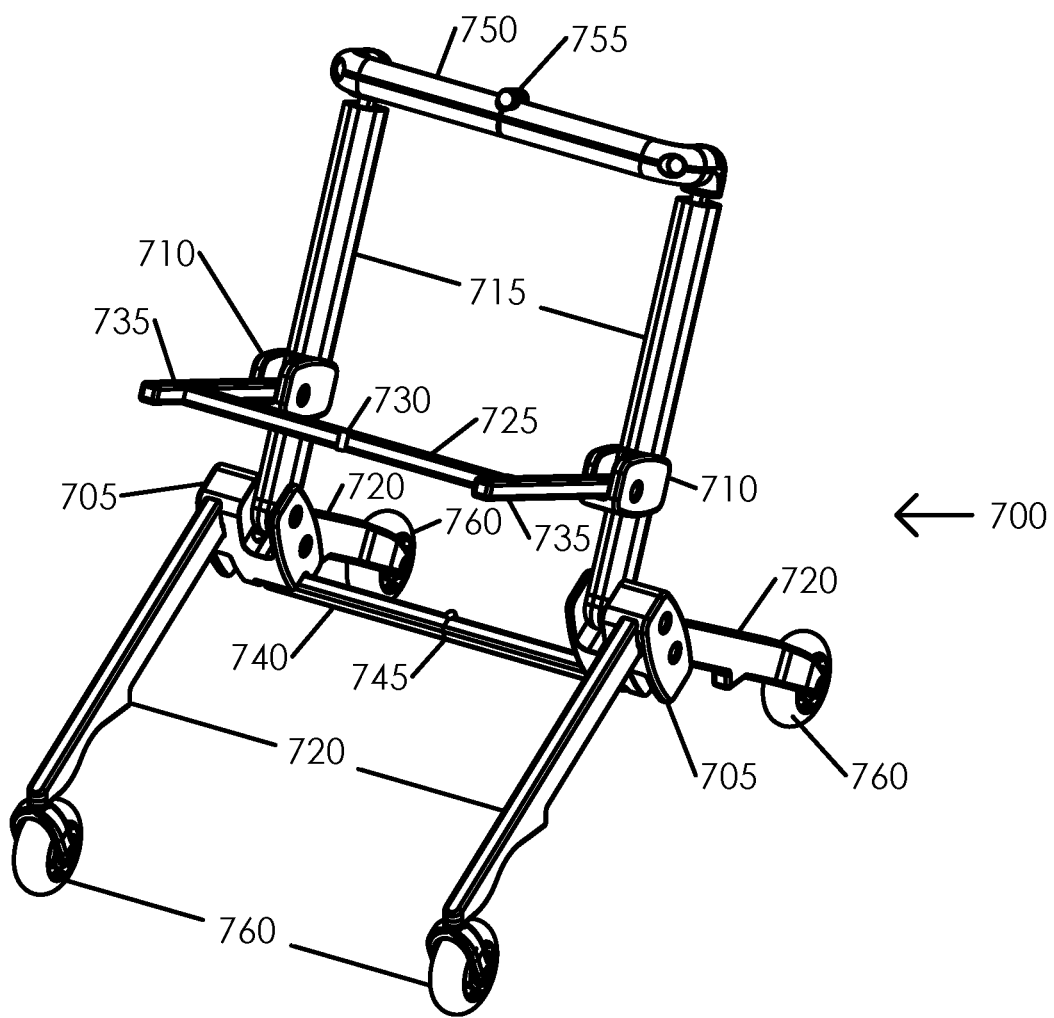
FIG. 7 is an exemplary ¾ front view of the foldable baby stroller with the telescoping support shaft fully retracted, according to an embodiment of the present invention.

FIG. 7 depicts an exemplary ¾ front view of the foldable baby stroller 700 with the telescoping support shaft fully retracted. As depicted, a pair of pivot assemblies 705 can support a pair of telescoping support shafts 715 and two pairs of legs 720 (four total). The pair of telescoping support shafts 715 are fully retracted as shown by telescoping the telescoping support shafts 715 into a retracted configuration. As depicted, the individual telescoping support shafts 715 can be approximately 12" to 15" long. Approximately 1" to 6" above the pivot assemblies 705 a pair of pivot brackets 710 can be mounted on telescoping support shafts 715. The pivot brackets 710 can be mounted so as to adjust by sliding up and down on telescoping support shafts 715. The pivot brackets 710 can include seat supports 735 that can pivot upward within pivot brackets 710. The seat supports 735 in turn can be connected by hinged lateral support brace 740, which can include locking hinge 745. The distal upper end of the telescoping shafts 715 can be capped by attached hinged handle 750, and locking hinge 755 can allow the hinged handle 750 to fold inward. Hinged lateral support brace 725 can connect pivot assemblies 705 together, and locking hinge 730 can allow the hinged lateral support brace 725 to fold inward. Finally, compact wheels 760 can be attached to legs 720.

Figure 8:
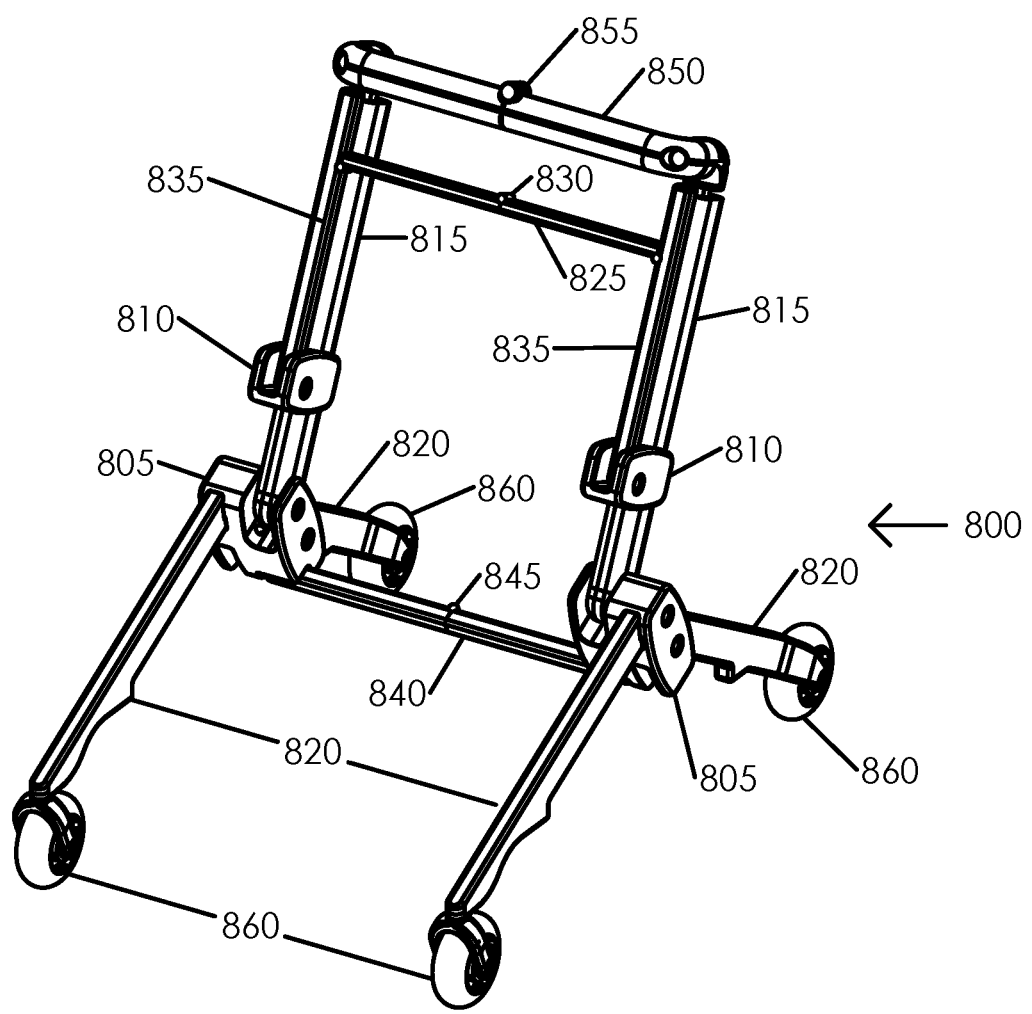
FIG. 8 is an exemplary ¾ front view of the foldable baby stroller with the seat supports folded, according to an embodiment of the present invention.

FIG. 8 depicts an exemplary ¾ front view of the foldable baby stroller 800 with the seat supports partially folded. As depicted, a pair of pivot assemblies 805 can support a pair of telescoping support shafts 815 and two pairs of legs 820 (four total). The pair of telescoping support shafts 815 are fully retracted as shown. Approximately 3" to 6" above the pivot assemblies 805 a pair of pivot brackets 810 can be mounted on telescoping support shafts 815. The pivot brackets 810 can be mounted so as to adjust by sliding up and down on telescoping support shafts 815. The pivot brackets 810 can include seat supports 835 that can pivot upward within pivot brackets 810. As depicted, the seat supports have been rotated upward approximately 90° to lay alongside and parallel to the telescoping support shafts 815. The seat supports 835 in turn can be connected by hinged lateral support brace 840, which can include locking hinge 845. The distal upper end of the telescoping shafts 815 can be capped by attached hinged handle 850, and locking hinge 855 can allow the hinged handle 850 to fold inward. Hinged lateral support brace 825 can connect pivot assemblies 805 together, and locking hinge 830 can allow the hinged lateral support brace 825 to fold inward. Finally, compact wheels 860 can be attached to legs 820.

Figure 9:
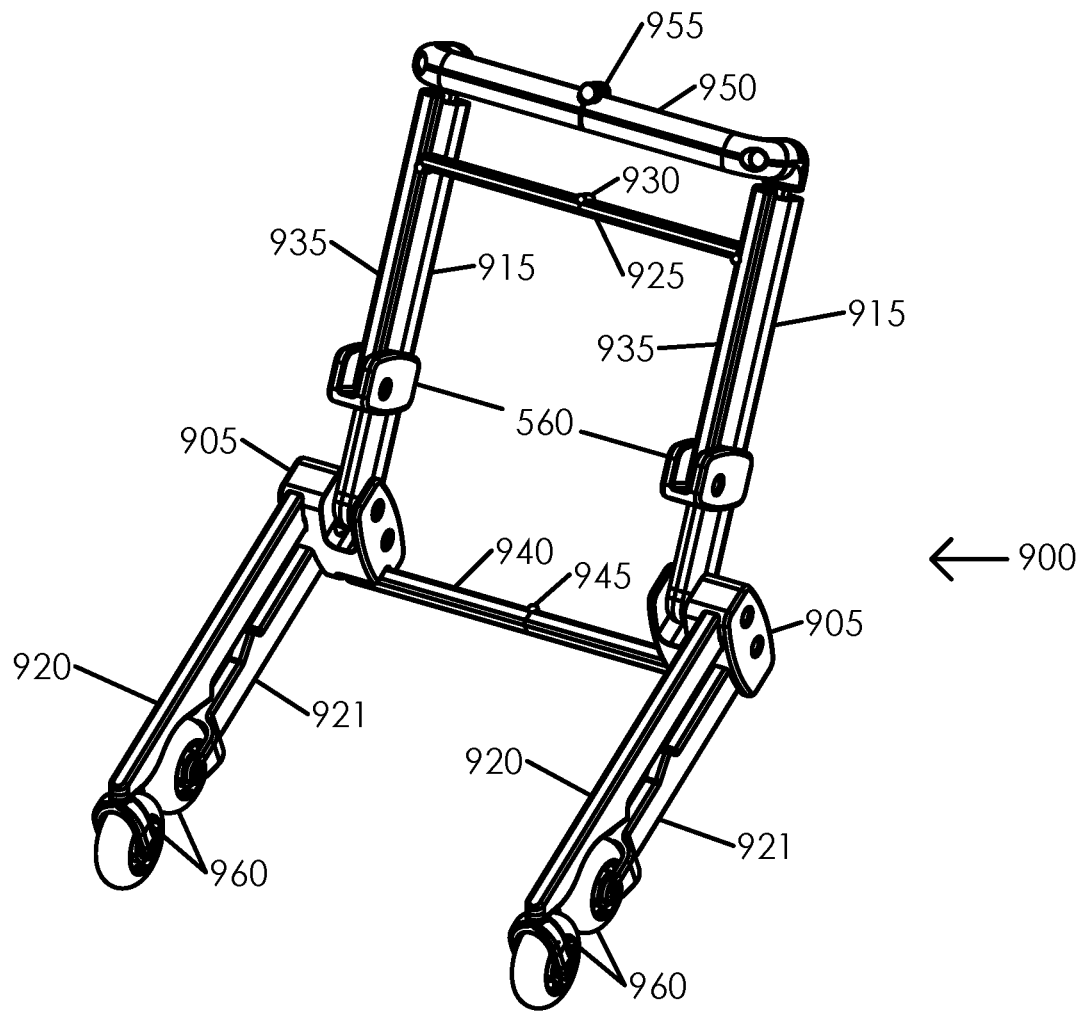
FIG. 9 is an exemplary ¾ front view of the foldable baby stroller with the legs folded, according to an embodiment of the present invention.

FIG. 9 depicts an exemplary ¾ front view of the foldable baby stroller 900 with the with the legs folded. As depicted, a pair of pivot assemblies 905 can support a pair of telescoping support shafts 915 and a front pair of legs 920 and a rear pair of legs 921 (four total). As depicted, the rear pair of legs 921 have been folded forward to fit underneath the front pair of legs 920. Wheels 960 are attached to legs 920 and 921, and are positioned so that the wheels 960 are stowed in tandem next to each other for each pair of legs 920 and 921. The pair of telescoping support shafts 915 are fully retracted as shown. Approximately 3" to 6" above the pivot assemblies 805 a pair of pivot brackets 910 can be mounted on telescoping support shafts 915. The pivot brackets 910 can be mounted so as to adjust by sliding up and down on telescoping support shafts 915. The pivot brackets 910 can include seat supports 935 that can pivot upward within pivot brackets 910. As depicted, the seat supports are rotated upward approximately 90° to lay alongside and parallel to the telescoping support shafts 915. The seat supports 935 in turn can be connected by hinged lateral support brace 940, which can include locking hinge 945. The distal upper end of the telescoping shafts 915 can be capped by attached hinged handle 950, and locking hinge 955 can allow the hinged handle 950 to fold inward. Hinged lateral support brace 925 can connect pivot assemblies 905 together, and locking hinge 930 can allow the hinged lateral support brace 925 to fold inward.

Figure 10:
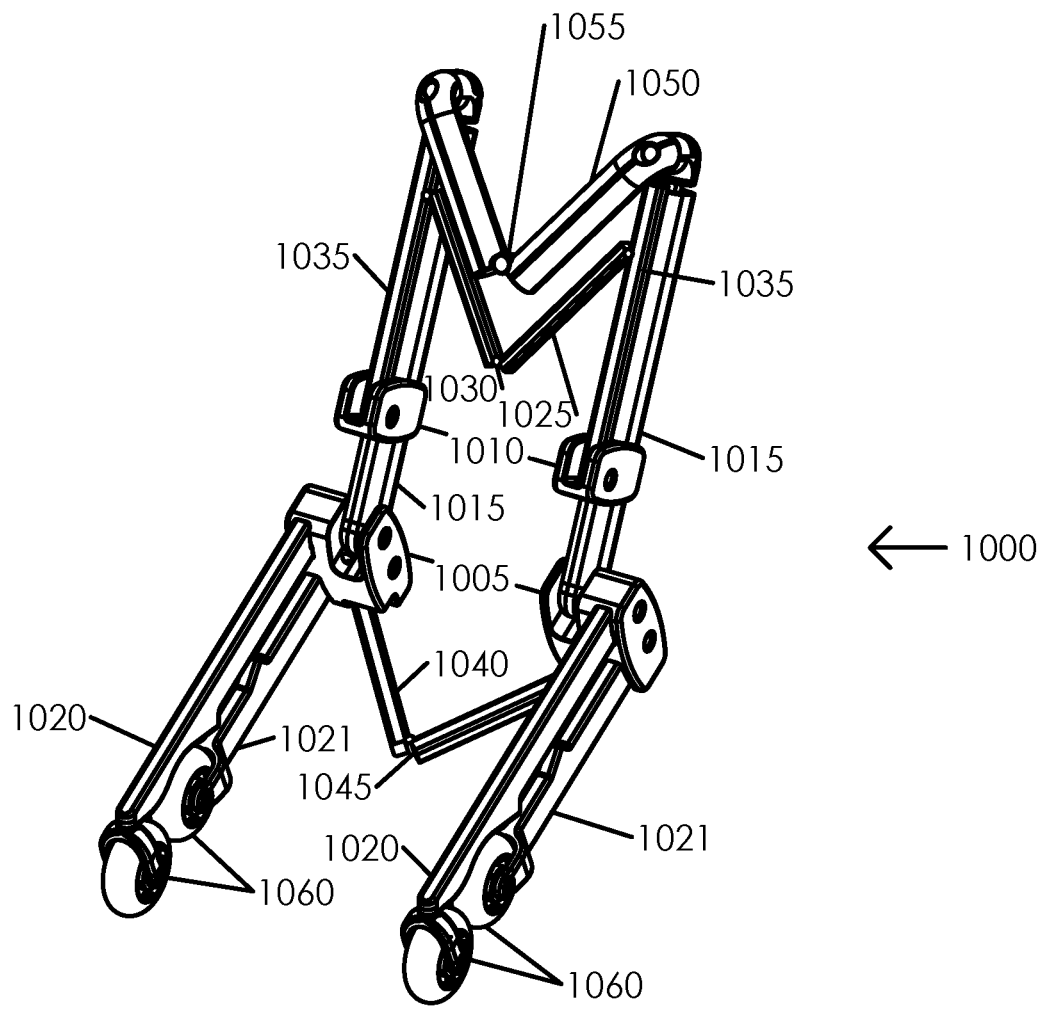
FIG. 10 is an exemplary ¾ front view of the foldable baby stroller with the hinged handle and lateral support braces partially folded, according to an embodiment of the present invention.

FIG. 10 depicts an exemplary ¾ front view of the foldable baby stroller 1000 with the hinged handle and lateral support braces partially folded. As depicted, a pair of pivot assemblies 1005 can support a pair of telescoping support shafts 1015 and a front pair of legs 1020 and a rear pair of legs 1021 (four total). As depicted, the rear pair of legs 1021 have been folded forward to fit underneath the front pair of legs 1020. Compact wheels 1060 are attached to legs 1020 and 1021, and are positioned so that the compact wheels 1060 are stowed in tandem next to each other for each pair of legs 1020 and 1021. The pair of telescoping support shafts 1015 are fully retracted as shown. Approximately 1" to 6" above the pivot assemblies 1005 a pair of pivot brackets 1010 can be mounted on telescoping support shafts 1015. The pivot brackets 1010 can be mounted so as to adjust by sliding up and down on telescoping support shafts 1015. The pivot brackets 1010 can include seat supports 1035 that can pivot upward within pivot brackets 1010. As depicted, the seat supports are rotated upward approximately 90° to lay alongside and parallel to the telescoping support shafts 1015. The seat supports 1035 in turn can be connected by hinged lateral support brace 1040, which can include locking hinge 1045. The distal upper end of the telescoping shafts 1015 can be capped by attached hinged handle 1050, and locking hinge 1055 can allow the hinged handle 1050 to fold inward. Hinged lateral support brace 1025 can connect pivot assemblies 1005 together, and locking hinge 1030 can allow the hinged lateral support brace 1025 to fold inward. As shown, locking hinge 1045 has been unlocked to partially fold lateral support brace 1040 inward, locking hinge 1055 has been unlocked to partially fold hinged handle 1050 inward, and locking hinge 1030 has been unlocked to partially fold lateral support brace 1025 inward.

Figure 11:
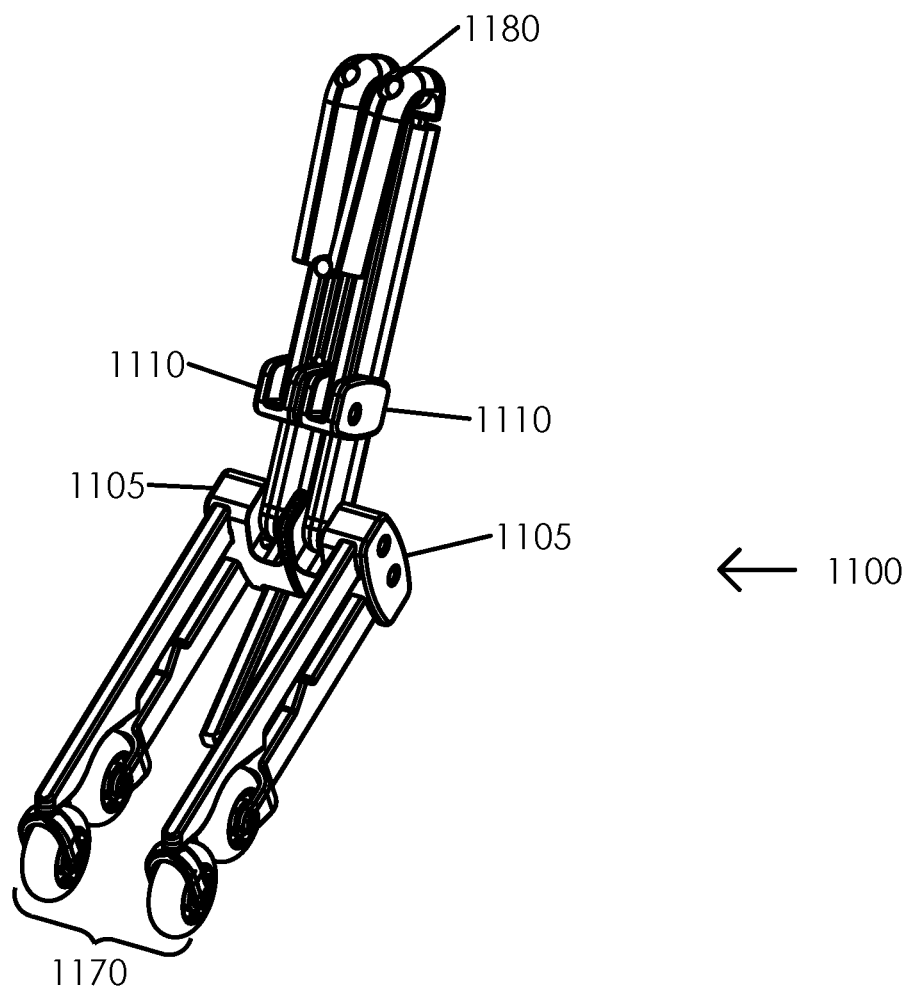
FIG. 11 is an exemplary ¾ front view of the foldable baby stroller with the hinged handle and lateral support braces fully folded, according to an embodiment of the present invention.

FIG. 11 depicts an exemplary ¾ front view of the foldable baby stroller 1100 with the hinged handle and lateral support braces fully folded. As depicted, the lower leg and wheel assemblies 1170 (referring to FIG. 10, legs 1020 and 1021 and wheels 1060) are fully folded together, and the upper telescoping support shaft and seat support assemblies 1180 (referring to FIG. 10, telescoping support shafts 1015, handle 1050, and seat supports 1035) are fully folded together. Pivot assemblies 1105 can facilitate rotating the upper telescoping support shaft and seat support assemblies 1180 forward approximately 120° to fit between and alongside the lower leg and wheel assemblies 1170. Pivot brackets 1110 remain mounted on upper the telescoping support shaft and seat support assemblies 1180.

Figure 12:
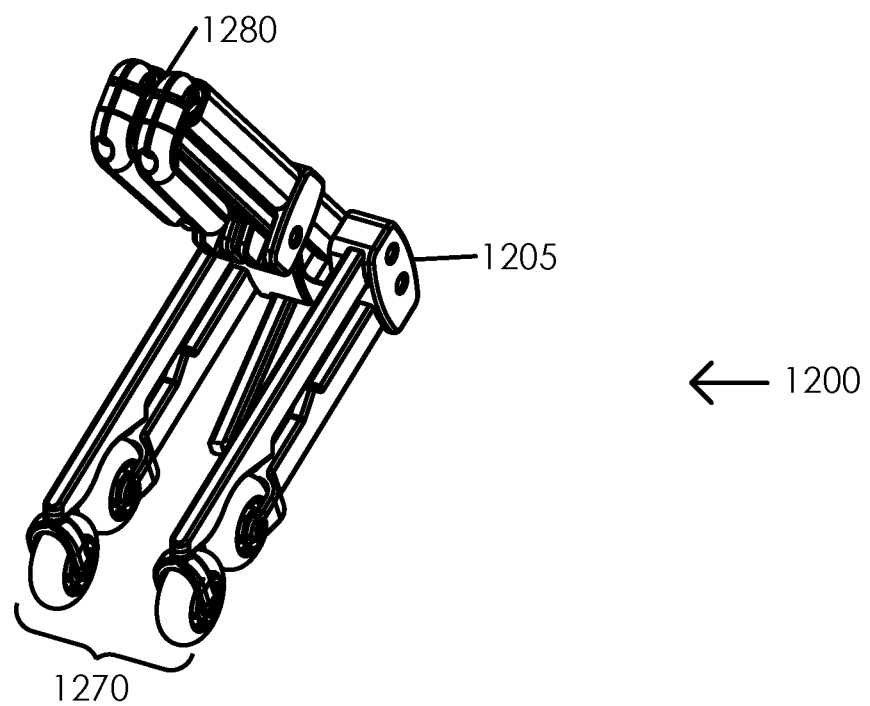
FIG. 12 is an exemplary ¾ front view of the foldable baby stroller with the telescoping support shafts and legs partially folded into one another, according to an embodiment of the present invention.

FIG. 12 depicts an exemplary ¾ front view of the foldable baby stroller 1200 with the telescoping support shafts and legs partially folded into one another. As depicted, the lower leg and wheel assemblies 1270 (referring to FIG. 10, legs 1020 and 1021 and wheels 1060) are fully folded together, and the upper telescoping support shaft and seat support assemblies 1280 (referring to FIG. 10, telescoping support shafts 1015, handle 1050, and seat supports 1035) are fully folded together. Pivot assemblies 1205 can facilitate rotating the upper telescoping support shaft and seat support assemblies 1280 forward approximately 120° to fit between and alongside the lower leg and wheel assemblies 1270. As shown, upper telescoping support shaft and seat support assemblies 1280 have been partially folded together approximately 90°.

Figure 13:
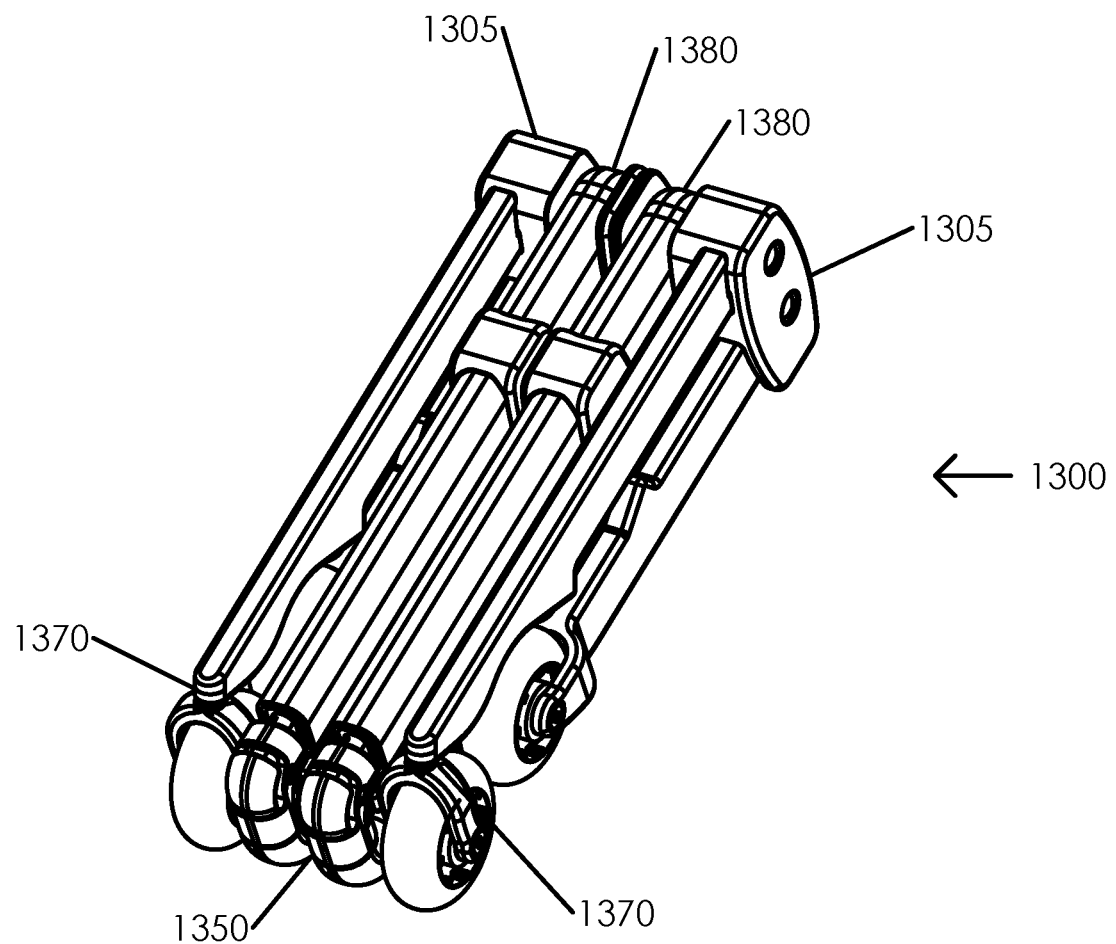
FIG. 13 is an exemplary ¾ front view of the foldable baby stroller with the telescoping support shafts and legs fully folded into one another, according to an embodiment of the present invention.

FIG. 13 depicts exemplary ¾ front view of the foldable baby stroller 1300 with the telescoping support shafts and legs fully folded into one another. As depicted, the lower leg and wheel assemblies 1370 (referring to FIG. 10, legs 1020 and 1021 and wheels 1060) are fully folded together, and the upper telescoping support shaft and seat support assemblies 1380 (referring to FIG. 10, telescoping support shafts 1015, handle 1050, and seat supports 1035) are fully folded together. Folded handle 1350 as depicted is positioned between the two upper telescoping support shaft and seat support assemblies 1380. Pivot assemblies 1305 facilitate fully rotating the upper telescoping support shaft and seat support assemblies 1380 forward approximately 120° to fit between and alongside the lower leg and wheel assemblies 1370 as shown.

Figure 14:
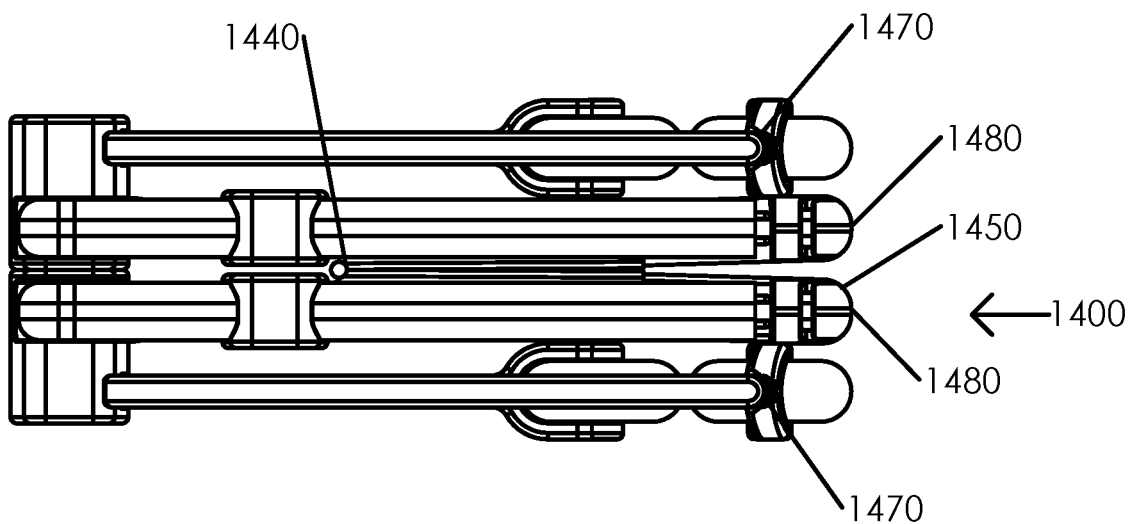
FIG. 14 is an exemplary top view of the foldable baby stroller with the telescoping support shafts and legs folded into one another, according to an embodiment of the present invention.

FIG. 14 depicts an exemplary top view of the foldable baby stroller 1400 with the telescoping support shafts and legs folded into one another. As depicted, the lower leg and wheel assemblies 1470 (referring to FIG. 10, legs 1020 and 1021 and wheels 1060) are fully folded together, and the upper telescoping support shaft and seat support assemblies 1480 (referring to FIG. 10, telescoping support shafts 1015, handle 1050, and seat supports 1035) are fully folded together. As depicted, folded handle 1450 as is positioned between the two upper telescoping support shaft and seat support assemblies 1480, and lateral support brace 1440 likewise is positioned between the two upper telescoping support shaft and seat support assemblies 1480. Pivot assemblies 1405 facilitate fully rotating the upper telescoping support shaft and seat support assemblies 1480 forward approximately 120° to fit between and alongside the lower leg and wheel assemblies 1470 as shown.

Figure 15:
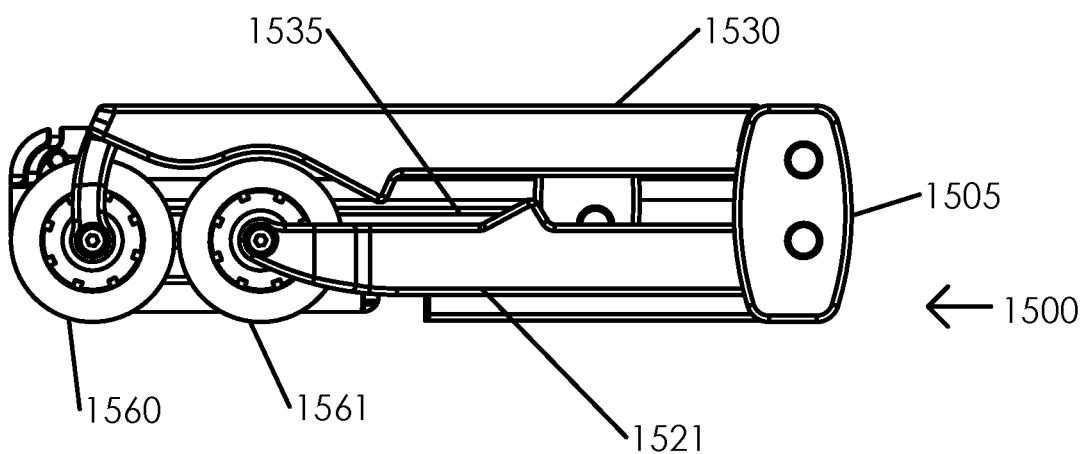
FIG. 15 is an exemplary side view of the foldable baby stroller with the telescoping support shafts and legs fully folded into one another, according to an embodiment of the present invention.

FIG. 15 depicts an exemplary side view of the foldable baby stroller 1500 with the telescoping support shafts and legs fully folded into one another. From the side, seat support 1535, front legs 1530, and rear legs 1521 can fit one on top of the other. In this embodiment, seat support 1535 can be integrated with pivot assembly 1505, which as shown can also include front leg 1520 and rear leg 1521. Front wheel 1560 can be attached to front leg 1520 and rear wheel 1561 can be attached to rear leg 1521.

Figure 16:
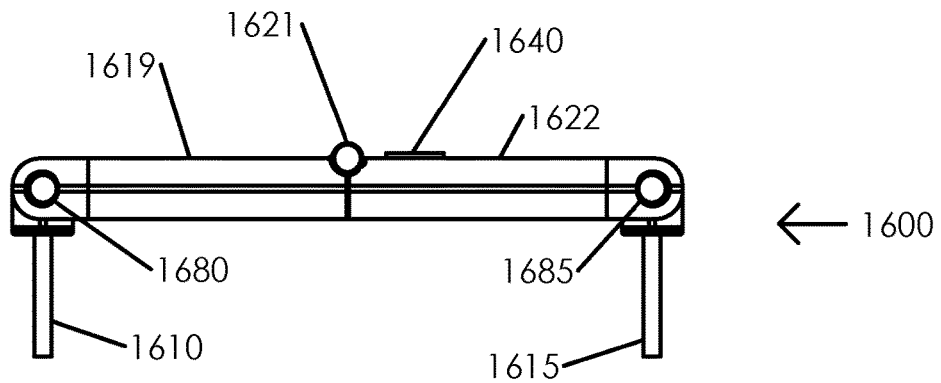
FIG. 16 is an exemplary isolated front view of the hinged handle, according to an embodiment of the present invention.

FIG. 16 depicts an exemplary isolated front view of the hinged handle 1600. As depicted, right half handle 1619 can connect to left half handle 1622 using locking hinge 1621 actuated by latch 1640. Right half handle 1619 can attach to right telescoping support shaft 1610 using pivot hinge 1680. Left half handle 1622 can attach to left telescoping support shaft 1615 using pivot hinge 1685.

Figure 17:
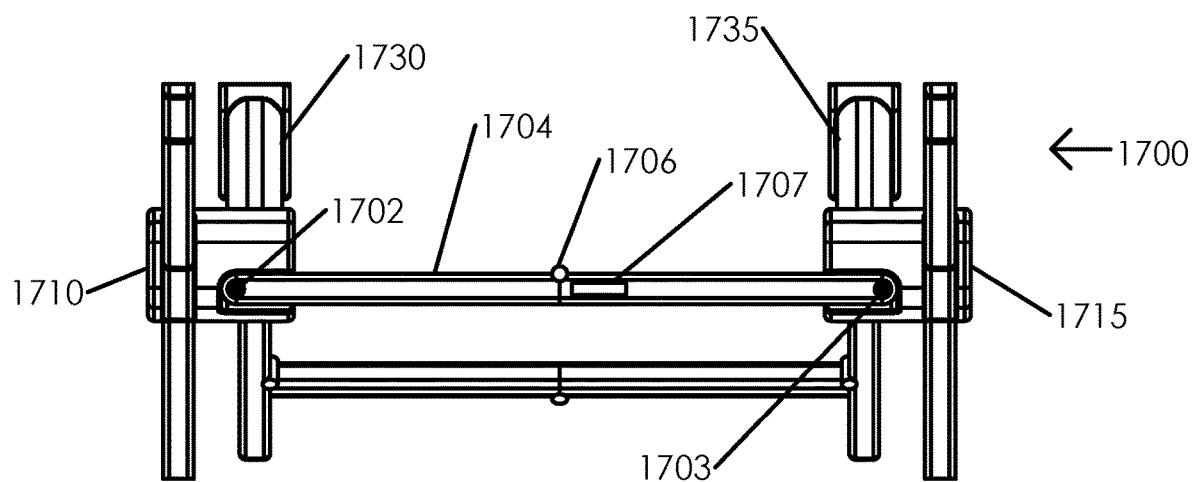
FIG. 17 is an exemplary isolated front view of a lateral support brace, according to an embodiment of the present invention.

FIG. 17 depicts an exemplary isolated front view of a lateral support brace 1700. Right pivot assembly 1710 can support right pivot joint 1702 and right telescoping support shaft 1730, and left pivot assembly 1715 can support left pivot joint 1703 and left telescoping support shaft 1735. Lateral support brace 1704 can attach to pivot assemblies 1710 and 1715 using pivot joints 1702 and 1703. Lateral support brace 1704 includes locking hinge 1706 actuated by latch 1707 to facilitate folding of lateral support brace 1704.

Figure 18:
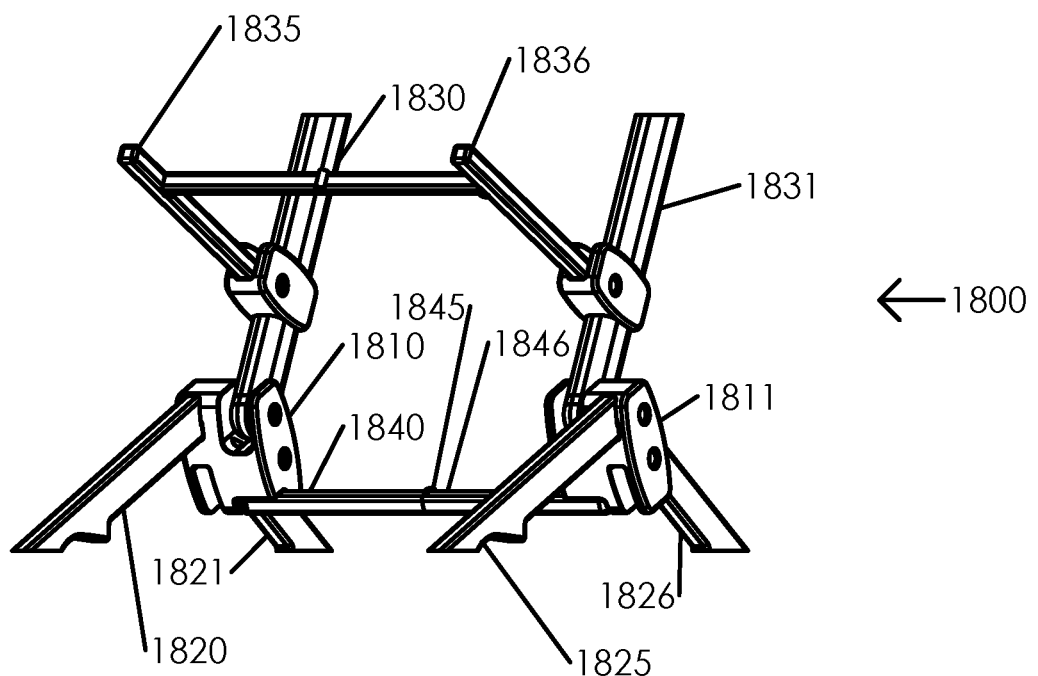
FIG. 18 is an exemplary ¾ isolated front view of the seat support and lateral support brace, according to an embodiment of the present invention.

FIG. 18 depicts an exemplary ¾ isolated front view of the seat support and lateral support brace 1800. Right pivot assembly 1810 can support right telescoping support shaft 1830, right seat support 1835, right front leg 1820, and right rear leg 1821. Left pivot assembly 1811 can support left telescoping support shaft 1831, left seat support 1836, left front leg 1825, and left rear leg 1826. Lateral support brace 1840 connects right pivot assembly 1810 to left pivot assembly 1811. Lateral support brace 1840 includes locking hinge 1845 actuated by latch 1846. In this embodiment, pivot assemblies 1810 and 1811 house and facilitate rotation of the telescoping support shafts 1830 and 1831 and leg 1826.

Figure 19:
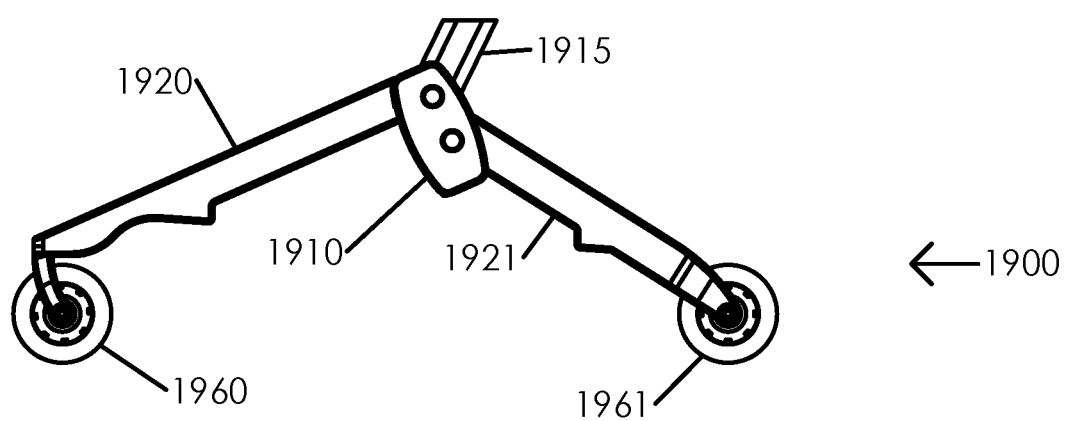
FIG. 19 is an exemplary isolated side view of the extended legs and wheels, according to an embodiment of the present invention.

FIG. 19 depicts an exemplary isolated side view of the extended legs and wheels 1900. As depicted, pivot assembly 1910 can support telescoping support shaft 1915, front leg 1920, and rear leg 1921. Wheel 1960 can attach to front leg 1920, and wheel 1961 can attach to rear leg 1921, and can facilitate rotation of rear leg 1921.

In an embodiment, the seat support 235, 335, 435, 535, 635, 735, 835, and 935 can be used to attach a standard commercial baby seat or a cloth seat can be attached.

In an embodiment, the approximate maximum dimensions of the fully folded baby stroller are 16" long by 9" wide by 5" tall and minimum dimensions are 12" long×4" wide× 3" tall.

Insofar as the description above and the accompanying drawing disclose any additional subject matter that is not within the scope of the single claim below, the inventions are not dedicated to the public and the right to the one or more applications to claim such additional inventions is reserved.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The foregoing has described methods and systems for a patient movement monitoring and feedback system that are given for illustration and not for limitation and uses. Thus, the inventions are limited only by the appended claims. Although the inventions have been described in accordance with the embodiments shown, one of ordinary skill in the art will readily recognize that there could be variations to the embodiments and those variations would be within the spirit and scope of the present inventions. Accordingly, many modifications may be made by one of ordinary skill in the art without departing from the spirit and scope of the appended claims.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventors may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventors. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventors contemplate the various aspects in any number of claim forms. Accordingly, the inventors reserve the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

Cloth reinforcing webbing can be attached to various components to improve lateral stability. Cross supports can be used to support the structure from twisting or folding. The material used here may also be metal, plastic, composite, or carbon fiber, but can also be fabric or rope, cord (or the like), or cable that is pulled tight when the stroller is extended, and further can include elastic cords connecting opposed support shafts (e.g., bungee cord) or paracord. This can also include adjustable plastic connectors. In a typical installation, opposed sides of the handle can be attached to opposed side of the support brace(s) by these cross supports. This can further comprise a mesh net spread between the support shafts; either elasticized or not.

The support shafts can extend by a folding, a scissor mechanism, or an external extension, or other mechanisms.

The legs can be locked into place and can unfold from any orientation if needed by the design.

The seat can be made of fabric, mesh, or any other suitable material and attaches to the seat supports and maybe the support shafts. Also, a removable seat that doubles as a car seat can be attached to the seat supports and the support shafts.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

I claim:

1. A foldable baby stroller, comprising:
a pair of collapsible support shafts arranged in parallel and configurable between a telescoped and a retracted configuration, each with a distal end connected by a hinged handle extending between the pair, wherein the hinged handle includes a first locking latch and further folds together between a folded and an extended configuration;

a pair of pivot assemblies, each supporting one of the collapsible support shafts attached to a proximal end and extending upward at an angle greater than 90° from horizontal and four legs, the support shafts locking in the telescoped configuration and unlocking to retract into the retracted configuration;

the pair of pivot assemblies also comprising two pairs of legs including at least one pair of rotating legs and one pair of fixed legs, each leg including an attached wheel at a distal end of the leg;

the pair of rotating legs that when in a closed configuration fit below, adjacent, and parallel to the fixed pair of legs with the attached respective wheels of each pair arranged in tandem, and that when in an open configuration are positioned at greater than or equal to 90° from and relative to the fixed pair of legs;

at least one hinged support brace linking the pair of pivot assemblies, wherein the support brace includes a second locking latch and further folds into the folded configuration and extends into the extended configuration;

a pair of seat supports that fold upward 90° and facilitates configuring between the extended configuration by extending downward 90° relative to the pair of collapsible support shafts and the folded configuration by folding upward to lay parallel to the pair of collapsible support shafts;

the pivot assemblies facilitate folding the pair of support shafts when in the retracted configuration, and the two pairs of legs when in the retracted configuration, together into the folded configuration;

wherein when folded together into the folded configuration, each one of the pair of support shafts and each one of the two pair of legs comprises a pair of shaft and leg assemblies positioned adjacent to and parallel to each other, and further comprise one of the pair of seat supports.

2. The foldable baby stroller of claim 1, further comprising:

the pair of seat supports mounted to the pair of support shafts using a pivot bracket supporting rotating the pair of seat supports upward 90°; and wherein the second pivot bracket attaches to the pair of support shafts above the pivot assembly.

3. The foldable baby stroller of claim 1, further comprising a second lateral support connecting the pair of seat supports together.

4. The foldable baby stroller of claim 1, wherein the pair of collapsible support shafts comprise concentric-sized sections designed to slide in and out of each other to telescope and retract and lock in the telescoped configuration.

5. The foldable baby stroller of claim 1, wherein the pair of collapsible support shafts comprise tubular sections designed to slide in and out of each other to telescope and retract and lock in the telescoped configuration.

6. The foldable baby stroller of claim 1, wherein the pair of collapsible support shafts telescope and retract by a sliding mechanism, a folding mechanism, a scissor mechanism, or an external extension.

7. The foldable baby stroller of claim 1, wherein the baby stroller in the folded configuration has a maximum length of approximately 13.5".

8. The foldable baby stroller of claim 1, wherein the seat supports facilitate attaching a cloth seat to hold a baby.

9. A method of constructing a reconfigurable baby stroller, comprising the steps of:

arranging a pair of collapsible support shafts in parallel and configurable between a telescoped and a retracted configuration, each with a distal end connected by a hinged handle extending between the pair of collapsible support shafts, wherein the hinged handle includes a first locking latch and further folds together between a folded and an extended configuration;

providing a pair of pivot assemblies, each supporting one of the collapsible support shafts attached to a proximal end and extending upward at an angle greater than 90° from horizontal and four legs, the support shafts lock into the telescoped configuration and unlock to retract into the retracted configuration;

attaching two pairs of legs to the pair of pivot assemblies, including at least one pair of rotating legs and one pair of fixed legs, each leg including an attached compact wheel at a distal end of the leg;

positioning the pair of rotating legs so that when in a closed configuration fit below, adjacent, and parallel to the fixed pair of legs with the attached respective wheels of each pair arranged in tandem, and that when in an open configuration are positioned at greater than or equal to 90° from and relative to the fixed pair of legs;

linking the pair of pivot assemblies with at least one hinged support brace, wherein the support brace includes a second locking latch and further folds into the folded configuration and extends into the extended configuration;

providing a pair of seat supports that fold upward 90° and facilitates configuring between the extended configuration by extending downward 90° relative to the pair of collapsible support shafts, and the folded configuration by folding upward to lay parallel to the pair of collapsible support shafts;

using the pivot assemblies to facilitate folding the pair of support shafts when in the retracted configuration, and the two pairs of legs when in the retracted configuration, together into the folded configuration;

wherein when folded together into the folded configuration, each one of the pair of support shafts and each one of the two pair of legs comprises a pair of shaft and leg assemblies positioned adjacent to and parallel to each other, and further comprise one of the pair of seat supports.

10. The method of constructing a reconfigurable baby stroller of claim 9, further comprising the step of:

mounting the pair of seat supports to the pair of support shafts using a pivot bracket supporting rotating the pair of seat supports upward 90°; and wherein the pivot bracket attaches to the pair of support shafts above the pivot assembly.

11. The method of constructing a reconfigurable baby stroller of claim 9, further comprising the step of connecting the pair of seat supports together using a second lateral support.

12. The method of constructing a reconfigurable baby stroller of claim 9, wherein the pair of collapsible support shafts comprise concentric-sized sections designed to slide in and out of each other to telescope and retract and lock in the telescoped configuration.

13. The method of constructing a reconfigurable baby stroller of claim 9, wherein the pair of collapsible support shafts comprise tubular sections designed to slide in and out of each other to telescope and retract and lock in the telescoped configuration.

14. The method of constructing a reconfigurable baby stroller of claim 9, wherein the pair of collapsible support shafts telescope and retract by a folding mechanism, a scissor mechanism, or an external extension.

15. The method of constructing a reconfigurable baby stroller of claim 9, wherein the baby stroller in the folded configuration has a maximum length of approximately 13.5".

16. The method of constructing a reconfigurable baby stroller of claim 9, wherein the seat supports facilitate attaching a cloth seat to hold a baby.

17. A folding baby stroller having a very compact folded and an extended configuration, comprising:
  two parallel collapsible support shafts configurable between a telescoped and a retracted configuration, with distal ends connected by a hinged handle, wherein the hinged handle locks between the folded configuration and the extended configuration;
  two pivot assemblies that support the two collapsible support shafts attached to a proximal end of the support shafts extending upward at an angle greater than 90° from horizontal, with four legs attached, and the support shafts telescope and lock in the telescoped configuration and unlock to retract into the retracted configuration;
  two pivot assemblies comprising four legs including at least one pair of rotating legs and one pair of fixed legs, each leg including an attached compact wheel at a distal end of the leg;
  the pair of rotating legs that when in a closed configuration fit below, adjacent, and parallel to the fixed pair of legs with the attached respective compact wheels of each pair arranged in tandem, and that when in an open configuration are positioned at greater than or equal to 90° from and relative to the fixed pair of legs;
  at least one hinged support brace linking the two pivot assemblies, wherein the support brace extends and locks in the extended configuration, and unlocks to fold into the folded configuration;
  a pair of seat supports that fold upward 90° and facilitates configuring between the extended configuration, by extending downward 90° relative to the pair of collapsible support shafts, and the folded configuration, by folding upward to lay parallel to the two of collapsible support shafts;
  the pivot assemblies facilitating folding the two support shafts when in the retracted configuration, and the two pairs of legs when in the retracted configuration, together into the folded configuration;
  wherein when folded together into the folded configuration, each one of support shafts and each one of the two pair of legs comprises a pair of shaft and leg assemblies positioned adjacent to and parallel to each other, and further comprise one of the pair of seat supports.

18. The folding baby stroller having a very compact folded and an extended configuration of claim 17, further comprising:
  the two seat supports mounted to the two support shafts using a second pivot assembly supporting rotating the pair of seat supports upward.

19. The folding baby stroller having a very compact folded and an extended configuration of claim 17, further comprising a second lateral support connecting the pair of seat supports together.

20. The folding baby stroller having a very compact folded and an extended configuration of claim 17, wherein the collapsible support shafts comprise concentric-sized sections designed to slide in and out of each other to telescope and retract and lock in the telescoped configuration.

* * * * *